No. 735,191. PATENTED AUG. 4, 1903.
R. ALLERT.
GREASE SEPARATOR.
APPLICATION FILED MAR. 7, 1903.
NO MODEL.
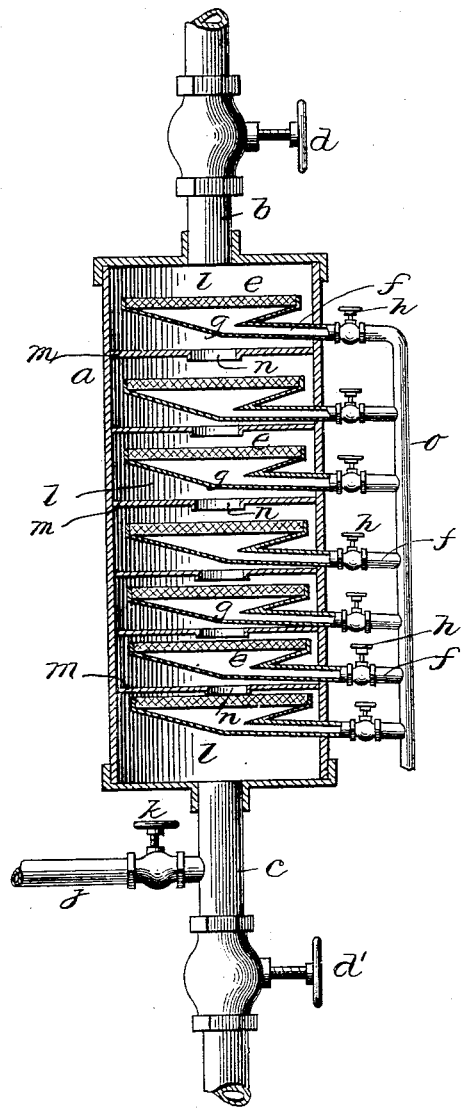
Witnesses
Ernest H. Boise.
M. Hyndman
Inventor
Rudolph Allert
By William R. Baird
His Attorney No. 735,191. Patented August 4, 1903.

UNITED STATES PATENT OFFICE.

RUDOLF ALLERT, OF PHILADELPHIA, PENNSYLVANIA.

GREASE-SEPARATOR.

SPECIFICATION forming part of Letters Patent No. 735,191, dated August 4, 1903.

Application filed March 7, 1903. Serial No. 146,623. (No model.)

*To all whom it may concern:*

Be it known that I, RUDOLF ALLERT, a citizen of the United States, residing at Philadelphia, in the county of Philadelphia and State of Pennsylvania, have invented certain new and useful Improvements in Grease-Separators, of which the following is a specification.

My invention relates to separators for removing oil or grease from fluids, such as exhaust-steam in which they are carried in suspension, and has for its object to provide improved means whereby to accomplish this purpose by bringing the grease-laden fluid into contact with plates of porous material and then draining the porous material of the absorbed oleaginous substances, whereby fresh surfaces are constantly presented to the action of the passing fluid.

The subject-matter of this application, of which the invention consists, is an apparatus by means of which the object is accomplished, said apparatus consisting of a separator which is, in effect, a steam-chamber provided with plates of porous material forming parts of the walls of drainage-chambers and means for draining the porous material and drainage-chambers of the absorbed oil or grease, all as hereinafter fully described and afterward specifically claimed.

The single figure in the drawing represents a separator embodying my invention in central longitudinal section.

Referring to the drawing by letters, $a$ is a chamber, made of any suitable size and material and provided with a suitable steam-inlet pipe $b$ and outlet-pipe $c$, each pipe being controlled by valves, as at $d$ $d'$. Within the chamber are arranged one or more plates, as at $e$, made of porous material, such as earthenware or baked clay, which are supported upon a structure closed below to exclude contact with the grease-laden fluid with the reverse side of the porous material, said supporting structure forming a drainage-chamber $g$ for the reception of the entrapped oil underneath the baffle-plates $e$. The drainage-chamber $g$ is provided with a pipe $f$, having a valve $h$ and leading to a suitable receptacle for the oil. As before stated, the supporting structure for the plate $e$ is the drainage-chamber itself, which in this instance is conically shaped and converges toward the bottom to the pipe $f$ and is steam-tight except through the porous plate.

The operation of my device is as follows: The grease-laden steam is let into the chamber $a$ through the pipe $b$, its valve being open for that purpose. The outlet-pipe $c$ is closed and the valve $k$ of the side-track pipe $j$ is open. This draws a current of steam through the apparatus for heating the porous material, and thus preventing the subsequent condensation of moisture thereon. After this operation has continued until the plates are sufficiently heated the valve $k$ is closed and the valve of the outlet-pipe and the valves $h$ of the drainage-pipes are opened. The drainage-pipes, it will be observed, communicate with the outer air. The pressure on the reverse side of the baffle-plates will be lower on this account than that on the upper side, against which the steam impinges. This difference in pressure insures the constant passage of the absorbed oil through the baffle-plates. If, however, this difference in pressure should not be sufficient, the pipe may be connected with a vacuum-pump or similar means for lessening the pressure within the drainage-chambers. The grease or oil deposited on the plates is absorbed thereby, is forced through the plates by the differences of pressure, collects within the drainage-chamber, and is subsequently removed through the pipes $f$. In its passage through the porous material the oil is filtered and purified and can again be used for many purposes, the operation of the separator thus accomplishing the manifold result of clearing the exhaust-steam of oily substances and purifying and saving such oily substances, which might otherwise be wasted.

In the special construction herein shown I have illustrated the steam-chamber separated into a plurality of compartments $l$, in each of which is a drainage-chamber $g$, the several compartments being separated by partitions or diaphragms $m$ $m$, having openings $n$ $n$ affording communication between the compartments, the drainage-pipes $f$ leading to a pipe $o$, which leads to any suitable receptacle.

I do not care to limit myself specifically to the use of a porous material, like earthenware. Any material having similar properties—as, for instance, charcoal, coke, asbestos, felt, &c.—may be employed, with results depending upon the efficiency of the particular absorbing medium used.

This device is very efficient and takes out practically all of the oil from exhaust-steam and may be used for the removal of oily material from ammonia or other fluid with equal success.

Having thus fully described my invention, what I claim as new, and desire to secure by Letters Patent of the United States, is—

1. In a grease-separator for exhaust-steam and the like, the combination with a steam-chamber, an outlet-pipe, an inlet-pipe and a drainage-pipe, of a drainage-chamber inside of the steam-chamber having an open top and otherwise steam-tight, and communicating with the drainage-pipe, and a porous plate closing the top of the drainage-chamber, substantially as described.

2. In a grease-separator for exhaust-steam and the like, the combination with the steam-chamber, an outlet-pipe, an inlet-pipe, and a drainage-pipe, of a plurality of diaphragms dividing the chamber into a number of compartments and having openings to afford communication between the compartments, a drainage-chamber in each compartment having an open top but otherwise steam-tight and communicating with the drainage-pipe, and a porous plate closing the top of each drainage-chamber, substantially as described.

Witness my hand this 5th day of March, 1903, at Philadelphia and State of Pennsylvania.

RUDOLF ALLERT.

In presence of—
JOSIE ALLERT,
JOHN H. ROYER.